United States Patent [19]

D'Angelo

[11] 4,076,326
[45] Feb. 28, 1978

[54] AUTOMATIC SAFETY BRAKE SYSTEM

[76] Inventor: Joe B. D'Angelo, 8719 Stanwood, Dallas, Tex. 75228

[21] Appl. No.: 753,369

[22] Filed: Dec. 22, 1976

[51] Int. Cl.$^2$ .......................................... B60T 17/04
[52] U.S. Cl. .................................. 303/18; 137/351; 303/1
[58] Field of Search ...................... 137/351; 303/1, 18, 303/19, 63, 86, 89

[56] References Cited

U.S. PATENT DOCUMENTS

| 2,847,023 | 8/1958 | Hansen et al. | 137/351 |
| 3,157,194 | 11/1964 | Stolte | 137/351 |
| 3,172,576 | 1/1965 | Hartung | 137/351 X |
| 3,526,438 | 9/1970 | England et al. | 303/18 |

*Primary Examiner*—Duane A. Reger
*Attorney, Agent, or Firm*—Rodgers, Eilers & Howell

[57] ABSTRACT

An automatic safety brake system for use with the air brake system of a tank-type vehicle for transporting and delivering volatile liquids. The automatic safety brake system has a connector to which hoses are connected for delivering liquid to or from the vehicle tank. A port is formed in the connector and has one opening which is connected by a hose to the emergency air line of the vehicle air brake system. Another opening of the port is adapted to contact in sealing engagement with a removable sealing cap, the cap also covering the opening of the connector through which the liquid flows to and from the vehicle tank. Tightening of the sealing cap on the connector seals the port allowing pressure to build up in the emergency line of the vehicle air brake system. Loosening of the cap opens the port to atmosphere thereby exhausting the emergency line of the vehicle air brake system and automatically applying vehicle brakes.

12 Claims, 3 Drawing Figures

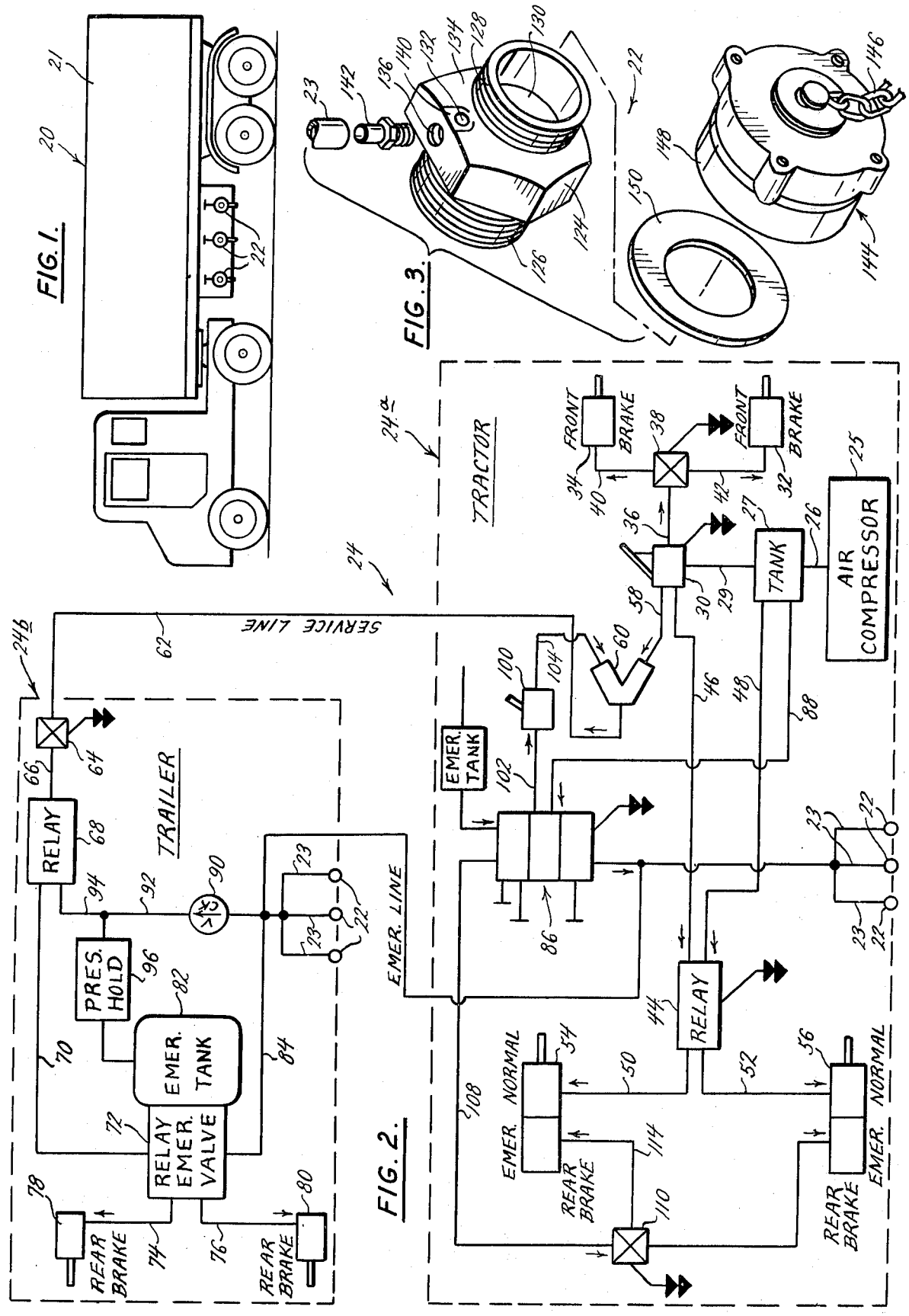

AUTOMATIC SAFETY BRAKE SYSTEM

BACKGROUND AND SUMMARY OF THE INVENTION

This invention generally relates to a system for automatically applying the brakes of a truck or tractor-trailer type vehicle for transporting volatile fluids during filling and emptying of the vehicle.

It is common practice to transport flammable or volatile fuels, such as for example liquid petroleum gas, gasoline, and the like, by tank-type tractor trailers or other large road vehicles utilizing tanks with hose connections for both filling and emptying the tanks. During such filling or emptying procedure, drivers have been known to drive away with the hoses connected causing the hoses to rupture. Because of the volative nature of these fuels, the consequences have been known to be catastrophic. Thus, it has been common to include with the vehicles, which are customarily equipped with air brakes, some form of safety brake system which applied the brakes beyond the control of the driver whenever the delivery hoses are connected. These known systems have used some means for exhausting the emergency line of the vehicle air brake system, but the arrangements used to achieve this result have included mechanical linkages which are susceptible to malfunction. Thus, in one such system connection of the delivery hose actuates a lever which opens one or more exhaust ports located in the emergency line through a mechanical linkage arrangement.

Applicant has succeeded in developing a system that positively locks the emergency brakes of the vehicle, whenever liquid is delivered to or from the vehicle tank, which has an exceptionally high degree of reliability, has no intricate linkage that can bind and wear out, and which is quite easy to install.

In a preferred embodiment of the invention, applicant's arrangement includes a port located at each of the fittings of the vehicle to which a delivery hose is connected for either filling or emptying the vehicle tank. This port is connected by a hose to the emergency line of the vehicle air brake system such that whenever the port is open to atmosphere the emergency line of the vehicle is exhausted and the emergency brakes are automatically applied. A cap is removably secured to the fitting and includes sealing means for sealing the port when the cap is tightly secured. To attach the delivery hose to the fitting, the cap must be removed which automatically unseals the port and applies the emergency brakes. With the cap removed, the driver is unable to move the vehicle.

Thus, it is a primary object of the invention to provide a system for automatically applying the brakes of the vehicle during filling or emptying operation of the vehicle tank, and which is exceptionally simple in structure and reliable in operation and which can be easily installed on existing vehicles.

BRIEF DESCRIPTION OF THE DRAWINGS

FIG. 1 is a side elevation view of a typical tank-type vehicle including the system of this invention;

FIG. 2 is a schematic of a typical air brake system utilizing positive air pressure for the vehicle of FIG. 1; and FIG. 3 is an exploded view of a hose fitting of a type used with this invention for the vehicle of FIG. 1.

DETAILED DESCRIPTION OF A PREFERRED EMBODIMENT

Referring to the drawing there is shown a typical tank-type vehicle 20 for hauling volatile fuels such as liquid petroleum, gasoline, and the like. The vehicle 20 has a tank 21 for containing the liquid and fittings or connectors 22 connected by suitable conduit (not shown) to the tank 21 and to which hoses may be connected for either filling or emptying the tank. Three such fittings 22 are shown with each customarily connected to a separate compartment of the tank 21 as is well known in the art. A fewer or greater number of fittings can be used.

In accordance with this invention, each of the fittings 22 has a port connected by a hose 23 to the emergency line of the vehicle air brake system as will be further described.

A typical vehicle air brake system 24 with which the safety brake system of this invention is used is shown in FIG. 2. The system 24 has a portion 24a for the tractor and 24b for the trailer. Because air brake systems of this type are well known in the art, its description will be given with reference to the schematic diagram of FIG. 2. Thus, an air compressor 25 develops an air supply which is fed through an air line or conduit 26 and to a storage tank 27 to provide a system pressure used to operate the other components in the air brake system. Air from the tank 27 is delivered through a line 29 to a foot treadle 30. When it is desired to apply the brakes during normal driving operation of the vehicle, the foot treadle 30, which is operated by the driver in the cab of the vehicle, applies an increasing air pressure to several outlet lines proportional to the amount the treadle is depressed by the driver. Thus, depression of the treadle 30 applies a proportionate air pressure to the front brake cylinders 32 and 34 through a line 36, a quick release valve 38, and lines 40 and 42 to apply the front brakes to slow or stop the vehicle.

The quick release valve 38 speeds the release time of the front brakes 32 and 34 by quickly exhausting the line upon a decreasing pressure as applied from the foot treadle 30. The other quick release valves to be described in the system operate in the same manner as is well known in the art to exhaust air pressures.

The foot treadle 30 also applies an increasing pressure to a brake relay 44 through a line 46, the relay 44 in turn applying air pressure in a proportional amount from the tank 27, as fed through a line 48 and lines 50 and 52 to the rear spring brake cylinders 54 and 56 of the tractor portion of the tractor-trailer vehicle.

The foot treadle 30 also applies an increasing pressure through a line 58, a double check valve 60, a service line 62, a quick release valve 64 and a line 66 to a second brake relay 68 located on the trailer portion of the vehicle. The relay 68 applies this increasing pressure through a line 70 to a relay emergency valve 72 which in turn applies air pressure through lines 74 and 76 to brake cylinders 78 and 80 of the rear brakes of the trailer to apply these brakes. The quick release valve 64 operates in the same manner as the valve 38.

The valve 72 has an emergency tank 82 associated with it and has a control inlet connected by an emergency line 84 to a safety brake control valve assembly 86. The assembly 86 includes valves which operate both manually and automatically and form the central control element of the emergency braking system for the vehicle. The assembly 86 is connected by a line 88 to the supply tank 27.

Air pressure is supplied to the emergency tank 82 during normal operation of the brake system through a one-way check valve 90 in a line 92 connected between the emergency line 84 and another line 94. The line 94 is connected between the relay 68 and the emergency tank 82 and includes a pressure regulator or pressure holding valve 96 for regulating the amount of pressure in the emergency tank 82.

A hand brake 100 receives air pressure from the safety brake control valve assembly 86 through a line 102, and may be used as the driver desires to apply this pressure through a line 104 and the double check valve 60 to the service line 62, to thus apply the trailer brakes 78 and 80.

The safety brake control valve assembly 86 is the central control element for the emergency portion of the air brake system 24. It provides a full pressure air supply through a line 108, a quick release valve 110, and lines 112 and 114 to compress the emergency springs contained within the rear tractor spring brakes 54 and 56. If this air pressure is decreased below a critical level, the quick-release valve 110 exhausts the lines 112 and 114 and the emergency springs (not shown) lock the rear brakes 54 and 56 until the pressure is restored. This decrease in air pressure can occur manually by operation of a switch on the safety brake control valve assembly 86 or automatically by a loss of pressure in the emergency line 84.

The trailer also has an emergency brake system that operates in a slightly different manner. The relay emergency valve 72 operates as a normal brake relay similar to 44 and 68 as long as full pressure is supplied to it through the emergency line 84. Thus, in normal operation the relay 72 applies air pressure to the brake cylinders 78 and 80 through the lines 74 and 76 in response to pressure applied through the line 70 from the relay 68. However, if there is a loss in pressure in the emergency line 84, the relay 72 applies the pressure from the emergency tank 82 to lock the rear brakes 78 and 80. The pressure in the emergency tank 82 is maintained at the system operating pressure by the one-way valve 90 and the pressure-holding valve 96. The trailer brakes 78 and 80 can also be locked as an emergency brake by a switch on the safety brake control valve assembly 86 which applies the air pressure maintained in an emergency tank 120 through the hand brake 100.

Thus, the operation of the air brake system 24 is such that if there is a pressure drop in the emergency line 84, both the rear brakes 54 and 56 on the tractor and the trailer brakes 78 and 80 are locked until the emergency line 84 is once again sealed and pressure built up in the line, and the safety control valve assembly 86 manually reset to a normal operation condition.

Referring to FIG. 3, there is shown the hose fitting or connector 22 for use in the system of this invention for filling and emptying the tank 21. The connector 22 has a male element 124 with threaded ends 126 and 128 and a relatively large opening 130 extending therethrough. The element 124 is rigidly mounted to the vehicle 20 with the end 126 connected by suitable conduit to the tank 21. The threaded end 128 is for attachment of an end of a suitable delivery hose for delivering liquid through the opening 130 of the element 124 either to or from the tank 21.

A port is formed in the central portion of the element 124 and has an opening 132 located in the face 134 of the element next to the threaded end 128, and has another opening 136 at the top of the central portion of the element. The port is located from the opening 130 so that there is no communication between them. The surface area surrounding the opening 132 is preferably flat and slightly raised as shown at 140 to aid in providing ready sealing of the opening 132 as will be further described. The opening 136 is threaded for reception of a suitable hose fitting 142 to which one end of the hose 23 is attached.

As shown schematically in FIG. 2, the other end of the hose 23 is connected in the emergency line 84 of the vehicle air brake system. This connection can be made at any location along the emergency line to accommodate either a truck or a tractor-trailer. There can also be any number of the connectors 22 connected into the emergency line 84. In the schematic two typical locations for the connections into the emergency line 84 are shown: one at the tractor and one at the trailer.

The connector 22 also includes a threaded cap 144 connected to the vehicle by a suitable chain 146 and having a pressure ring 148 which retains a neoprene sealing gasket 150. The gasket 150 is pressed firmly against the surrounding surface 140 of the opening 132 to seal the opening 132 whenever the cap 144 is firmly tightened onto the end 128.

Thus, in a typical delivery operation of the tank-type vehicle 20, the vehicle is positioned by the driver as desired for access to the connector 22. The pressurized cap 144 with the neoprene gasket 150 is removed from the element 124, thereby exposing the opening 132 and its exhaust port to atmospheric pressure. This causes the pressure in the emergency line 84 to drop, a condition which is sensed by the safety brake control valve assembly 86, valve 110, and the relay emergency valve 72, automatically applying the tractor brakes 54 and 56 and trailer brakes 78 and 80.

Suitable delivery hoses (not shown) are threaded onto the end 128 of the element 124 and delivery of the liquid either into or out of the tank 21 is commenced. As long as the opening 132 is unsealed, the emergency line 84 is exhausted and the driver cannot move the vehicle, even inadvertently.

Once the filling or delivering operation has been completed, the pressurized cap 144 with the gasket 150 is rethreaded onto the element 124 to seal the port 132. Pressure can then be built up in the emergency line 84 to resume normal operation.

Various changes and modifications may be made in this invention, as will be readily apparent to those skilled in the art. Such changes and modifications are within the scope and teaching of this invention as defined by the claims appended hereto.

What is claimed is:

1. An automatic safety brake system for a vehicle having a tank for transporting liquid and delivering liquid to or from the vehicle tank, said vehicle having an air brake system, said automatic safety brake system comprising a connector having an opening therethrough in communication with said vehicle tank for delivering of liquid through said opening to or from said tank, means having a port therein, said connector associated with said vehicle air brake system for applying vehicle brakes in response to a change in pressure within said port, a cap removably secured to said connector, and sealing means operable by said cap for sealing said port when said cap is in a preselected position relative to said connector, the pressure in said port being at a different level with the sealing means in sealing engagement with said port than out of such sealing engagement.

2. The safety brake system of claim 1 wherein said vehicle air brake system has an emergency line and means for applying vehicle brakes in response to a preselected change in pressure in said emergency line, and further comprising means connecting said port with said emergency line.

3. The safety brake system of claim 1 wherein said port is formed in the housing of said connector, said port being out of communication with said connector opening.

4. The safety brake assembly of claim 1 wherein said cap completely covers the opening of said connector when secured thereto.

5. An automatic safety brake system for a vehicle having a tank for transporting liquid and delivering liquid to or from the vehicle tank, said vehicle having an air brake system, said automatic safety brake system comprising a connector having an opening therethrough in communication with said vehicle tank for delivering of liquid through said opening to or from said tank, said connector having a port therein, means associated with said vehicle air brake system for applying vehicle brakes in response to a decrease in pressure within said port, a cap removably secured to said connector, and sealing means associated with and operable by said cap for sealing said port when said cap is secured to said connection, the pressure in said port being higher with said sealing means in sealing engagement with said port than out of such sealing engagement.

6. The safety brake assembly of claim 5 wherein said vehicle air brake system has an emergency line and means for applying vehicle brakes in response to a decrease in pressure in said emergency line, and further comprising means connecting said port with said emergency line.

7. The safety brake system of claim 5 wherein said port is formed in the housing of said connector, said port being out of communication with said connector opening, said port having an opening located at a face of said connector, said sealing means being retained by said cap and operable by said cap to seal said port opening when said cap is secured to said connector.

8. The safety brake system of claim 7 wherein said sealing means is an annular gasket.

9. The safety brake system of claim 8 wherein said cap completely covers said connector when secured thereto.

10. The safety brake system of claim 7 wherein an area of the face of the connector surrounding said port opening is raised relative to other areas of the face for ready sealing engagement with said sealing means.

11. An automatic safety brake system for a vehicle having a tank for transporting liquid and delivering liquid to or from the vehicle tank, said vehicle having an air brake system, said automatic safety brake system comprising a connector having an opening therethrough in communication with said vehicle tank for delivery of liquid through said opening to or from said tank, said connector having a port therein which port is out of communication with said connection opening and has an opening located in a face of said connector, said vehicle air brake system having an emergency line and means for applying vehicle brakes in response to a decrease in pressure in said emergency line, means connecting said port to said emergency line such that a change in pressure in said port produces a corresponding change in pressure in said emergency line, a cap removably secured to said connector, said cap having sealing means associated therewith and operable thereby for sealing said port when said cap is secured to said connector, the pressure in said port being at a higher level with the sealing means in sealing engagement with said port than out of such sealing engagement.

12. The safety brake system of claim 11 wherein said cap completely covers said connector opening when secured thereto, and wherein said sealing means is an annular gasket retained by said cap.

* * * * *